(No Model.)

E. T. ROBB & A. W. SCHLEICHER.
DRIVING GEAR.

No. 299,013. Patented May 20, 1884.

Witnesses:
John E. Parker
James F. Tobin

Inventors
Eliakim T. Robb
Adolph W. Schleicher
by their Attys
Howson & Sons

N. PETERS. Photo-Lithographer, Washington, D. C.

United States Patent Office.

ELIAKIM T. ROBB, OF CHESTER, AND ADOLPH W. SCHLEICHER, OF PHILADELPHIA, PENNSYLVANIA.

DRIVING-GEAR.

SPECIFICATION forming part of Letters Patent No. 299,013, dated May 20, 1884.

Application filed February 16, 1884. (No model.)

*To all whom it may concern:*

Be it known that we, ELIAKIM T. ROBB, a resident of Chester, Pennsylvania, and ADOLPH W. SCHLEICHER, a resident of Philadelphia, Pennsylvania, both citizens of the United States, have invented certain Improvements in Driving-Gear, of which the following is a specification.

Our invention consists, mainly, of the combination of a shaft, a pulley or wheel, and a hub, one being loose and the other fast on the said shaft, with a helical spring or springs interposed between and secured to the pulley and hub, substantially as described hereinafter, the object of our invention being to neutralize by the said springs the effect of any irregularities which may occur in the running of the shaft.

Figure 1:
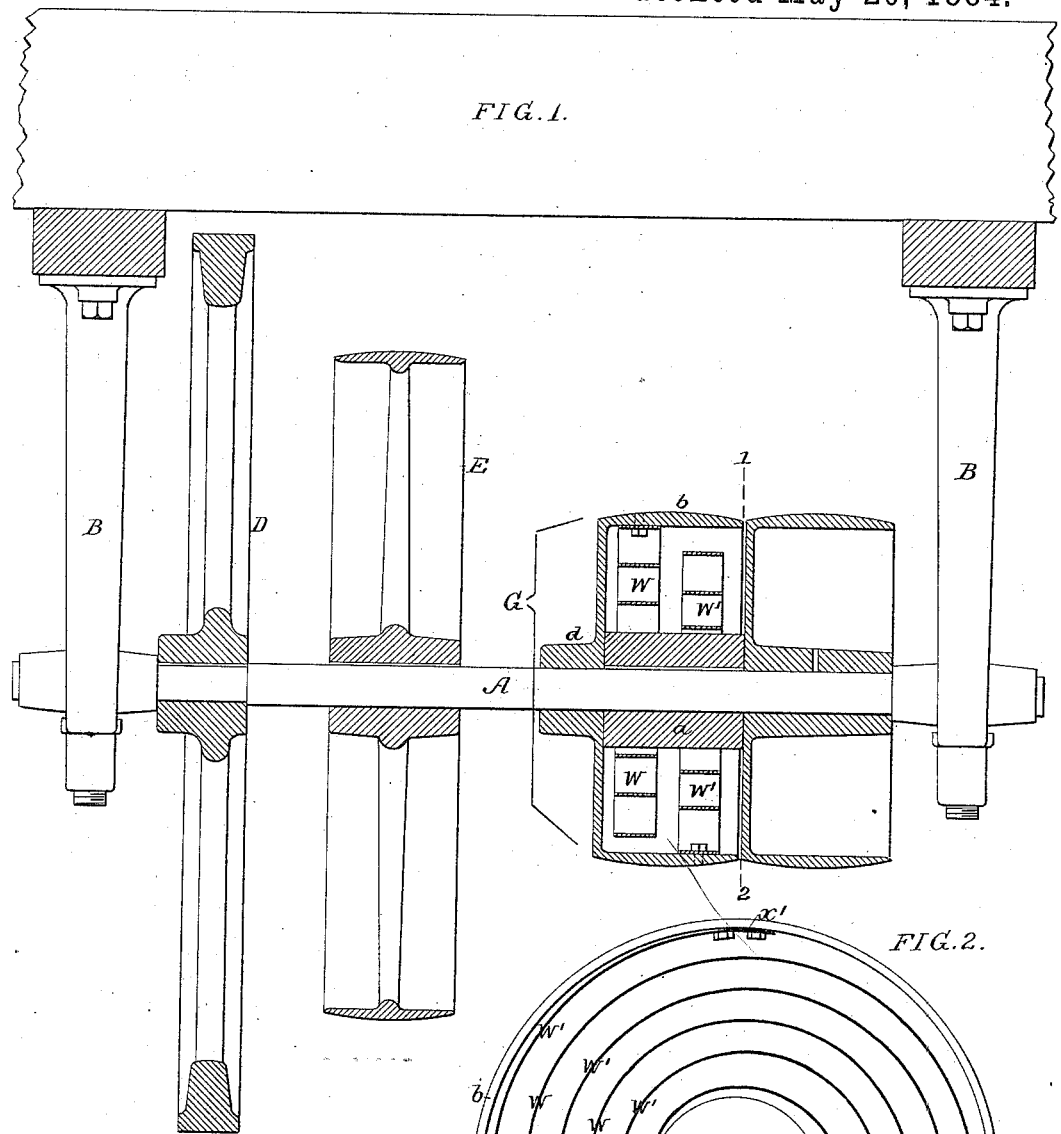
Figure 2:
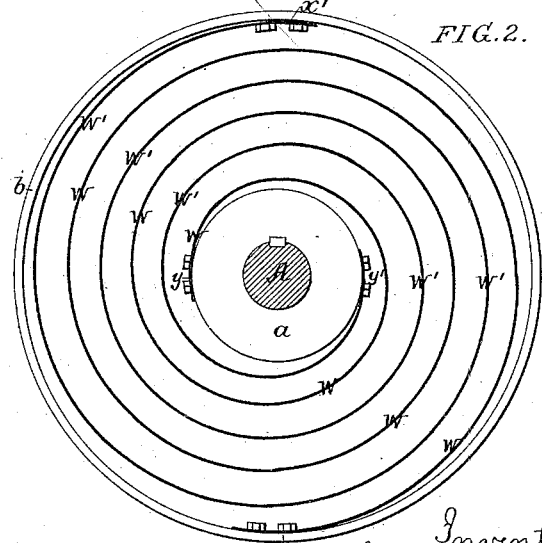

In the accompanying drawings, Figure 1 illustrates, partly in section, our invention applied to a counter-shaft; Fig. 2, a transverse section on the line 1 2, and Fig. 3 a modification of our invention.

A pulley, G, having a rim, $b$, and hub $d$, is loose on the counter-shaft A, and this pulley is connected by a helical spring or springs to a hub, $a$, which is keyed or otherwise secured to the said shaft, and which may be a simple enlargement of the same, the said spring or springs being contained within the pulley, so as to afford a direct elastic connection between the latter and the hub. There are in the present instance two precisely similar helical springs, W W', secured at their outer ends to the rim of the pulley at points $x\ x'$, diametrically opposite each other, and at their inner ends to the hub $a$ at points $y\ y'$, also diametrically opposite to each other, as shown in Fig. 2.

It may be remarked here that while one helical spring only may be used as a means of connecting the rim of the pulley to the hub $a$, in carrying out our invention, we much prefer two precisely similar springs applied in the manner described above, so that the pulley may be properly balanced.

More than two springs may be used; but whatever the number of springs may be, regard should be had to such attachment of them to the rim of the pulley and hub $a$ as to attain this balancing effect.

In the present instance the shaft is adapted to bearings in hangers B B, and carries the loose pulley M, the pulley E, and fly-wheel D, G being in this case the driven pulley, and E the pulley which, through the medium of a belt, transmits power to any machine. The pulley G, however, may be the driver. It may, for instance, be applied to the crank-shaft of a steam-engine in connection with the main driving-belt.

The spring or springs interposed between and secured to the pulley and hub tend to so neutralize the effect of any want of uniformity in the rotation of the shaft that the irregularities are not transferred to the pulley. In other words, the springs by their tension and recoil under the influence of irregularities in the movement of the shaft absorb or in a great measure absorb such irregularities. In effecting this purpose the fly-wheel is an important element, as will be readily understood by those who are familiar with the art to which our invention relates; but a pulley or wheel on the shaft may be of such diameter and weight as to be the equivalent of a fly-wheel.

It will be also understood that G may be a cog-wheel, either a driving or driven wheel.

Figure 3:
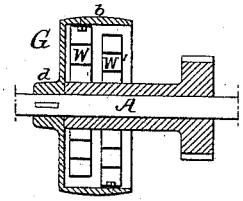

In the modification, shown in Fig. 3 the hub $a$ is loose on the shaft, and the pulley or wheel G fast thereon, a spring or springs being interposed between the hub and pulley in the manner described above.

We have shown the springs W W' side by side, the pulley G being wide enough to permit this arrangement; but in narrow pulleys it may be advisable to place all of the springs in the same plane, so that they will not occupy so much space laterally in the pulley.

We claim as our invention—

1. The combination of a driving or driven pulley or wheel, a shaft, and a fly-wheel and hub carried thereby with a helical spring or springs contained within the pulley, interposed between the rim of the latter and the hub, and connected to both rim and hub, all substantially as set forth.

2. The combination of a driving or driven pulley or wheel, its shaft, and fly-wheel and hub carried thereby with two or more helical springs contained within the said pulley, and secured to the rim of the latter and to the hub at such points that the said springs will balance each other, substantially as set forth.

In testimony whereof we have signed our names to this specification in the presence of two subscribing witnesses.

ELIAKIM T. ROBB.
ADOLPH W. SCHLEICHER.

Witnesses:
JOHN E. PARKER,
HARRY SMITH.